June 8, 1937.  J. M. BIERER  2,083,527
PRESSURE BAND FOR VULCANIZING MACHINES
Filed May 26, 1936
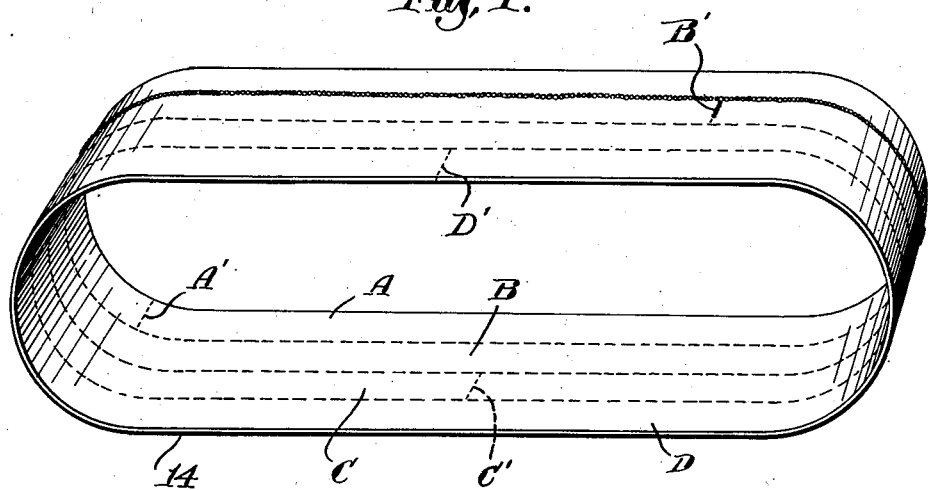
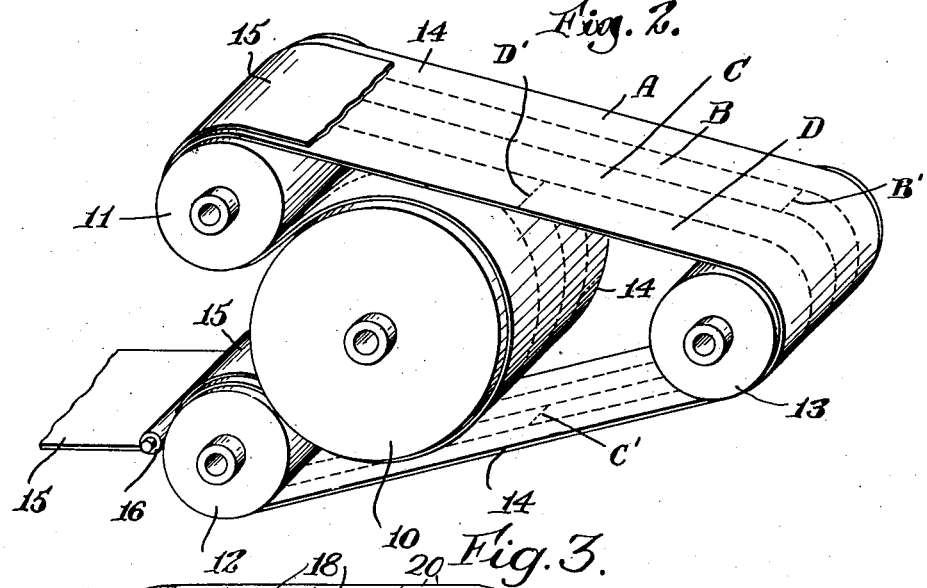
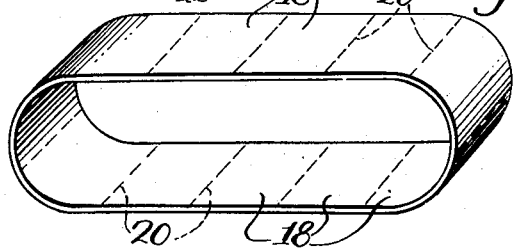
Inventor
John M. Bierer.
by Kenway & Witter
Attorneys Patented June 8, 1937

2,083,527

UNITED STATES PATENT OFFICE 2,083,527

PRESSURE BAND FOR VULCANIZING MACHINES

John M. Bierer, Newton, Mass., assignor to Boston Woven Hose & Rubber Company, Cambridge, Mass., a corporation of Massachusetts Application May 26, 1936, Serial No. 81,839

5 Claims. (Cl. 74—231)

This invention relates to machines for curing or vulcanizing sheet rubber or rubberized goods in which the operation is carried out by passing the goods about the circumference of a heated cylinder under the pressure of a continuous band. More especially the invention consists in a wide, one piece pressure-exerting band of novel construction and having the capacity of operating under high tension.

An important field of use of the invention is in the manufacture of rubberized belting, flooring, topping material and the like. In vulcanizing such goods the calendered material is maintained under severe pressure beneath a steel band which travels about a portion of the circumference of the vulcanizing drum and is maintained under high tension to develop the requisite pressure. Heretofore the capacity of such machines has been limited in the width of the goods treated because it has been impossible to produce steel tension bands in one piece of more than perhaps 22 inches in width. Accordingly, while manufacturers have been eager to produce such goods as conveyor belting up to 72 or 84 inches in width by a process of continuous vulcanization on a vulcanizing drum, it has been impossible heretofore to provide an adequate pressure band and wide goods of this character have therefore of necessity been vulcanized in step-by-step manner in plate vulcanizing machines.

The present invention rests upon my discovery that it is possible to build up a composite steel pressure band from a plurality of band sections of high tensile strength united by welding along their adjacent edges. In the preferred construction the band sections are of equal length and each made endless by a transverse weld and are united along their longitudinal edges in such relation that the transverse welds are staggered by appreciable spacing. In a pressure band of such construction the factor of safety does not depend on the strength of the transverse welds since their location is staggered in such manner that each weld is supported by the full strength of the adjacent sections. It is therefore entirely practicable to build up an integral pressure band of any desired or convenient width and correspondingly to increase the range or capacity of drum vulcanizing machines.

These and other features of the invention will be best understood and appreciated from the following description of a preferred embodiment thereof, selected for purposes of illustration and shown in the accompanying drawing in which, Fig. 1 is a view in perspective of a complete band shown more or less conventionally, and Fig. 2 is a view in perspective illustrating diagrammatically the manner in which the pressure band is used in a vulcanizing machine.

Fig. 3 is a view in perspective of a modified form of band.

As illustrative of the general type of vulcanizing machine to which this invention relates, Fig. 2 discloses a heated vulcanizing drum 10 and three guide rolls 11, 12, and 13 about which is directed the steel pressure band 14. The machine frame is omitted from the drawing for the sake of clearness but it will be understood that suitable bearings are provided for the drum and rolls and that the bearings for the rearmost roll 13 are removable and urged away from the drum 10 by hydraulic mechanism so that the band 14 is maintained at all times under a severe tension.

The lower guide roll 12 is heated and the sheet material 15 to be treated is led to the drum 10 over a portion of the circumference of this heated roll, being held in contact therewith by an idler 16. The material is thus preliminarily heated before it passes into the bight of the band 14 and there it is engaged between the circumference of the drum 10 and one face of the band 14. The material 15 is thus maintained under heavy pressure during its travel about the drum and is vulcanized under conditions of heat and pressure and also molded by this treatment into a smooth compact sheet.

From the foregoing explanation it will be apparent that the band 14 must be of great strength, perfectly smooth and of uniform thickness in order that it may run smoothly in the machine. The overall width of the band herein shown may be assumed, for purposes of illustration, to be 84 inches and to be made up of four endless sections A, B, C, and D each 21 inches in width and all welded into an integral homogeneous band.

The sections A, B, C, and D are independently manufactured, for example from high carbon steel of 300,000 lbs. tensile strength. The four sections are then assembled and welded together by continuous longitudinal welds and transverse welds A', B', C', and D'. Any commercial butt-welding method may be employed, such as the oxy-acetylene method in which an oxy-acetylene flame is applied to adjacent edges reducing them to a molten condition in which they will fuse together, additional steel being supplied from a welding rod. In Fig. 1 a freshly formed weld is shown between the sections A and B at the upper side of the band. The welded portions are subjected to forging, grinding and polishing to produce a smooth homogeneous surface in the band, and the completed band is then subjected to heat treating or tempering.

It is important to locate the transverse welds A', B', C', and D' in longitudinally staggered relation and as herein shown the transverse welds in adjacent sections are separated by substantially half the band length and are thus supported on both sides by the full strength of both adjacent sections.

An important characteristic of the band of my invention is its smooth continuous surface, this being required in order to produce a smooth faced vulcanized product. Attempts have been made heretofore to operate with a lap-welded band but this has not proved practicable since any surface irregularity in the band is transferred to the vulcanized product.

Another important characteristic of the band of my invention is its strength. In order to secure the severe pressure necessary to the successful vulcanizing process a tension as high as 30 to 40 tons is required in the band. These requirements are too severe to permit the employment of commercial sheet steel but necessitate a high carbon steel having a tensile strength of from 160,000 to 300,000 lbs. per square inch.

It is these exacting requirements that are successfully met by the present invention with the result that the capacity of continuous vulcanizing machines is increased far beyond anything heretofore possible and wider and more perfectly vulcanized goods are made available in the market.

While it is preferable for reasons already pointed out to unite the band sections with their transverse welds in staggered relation, it is practicable to locate the transverse welds close together or even to align them transversely in the belt. It is also practical, under some conditions, to construct the pressure band of a series of transversely arranged band sections butt-welded together without longitudinal seams. Such a band is illustrated in Fig. 3 of the drawing and comprises a series of sections 18 of flat sheet steel stock of high tensile strength and of a length equal to the width of the band. These sections are united by edge to edge welds 20 into an integral unit of uniform thickness and are ground and polished to present a smooth and continuous work-engaging surface throughout the face that is to contact with the vulcanizing drum 10 or the material pressed thereon. Since a composite pressure band of this type for use in a vulcanizing machine is a new article in the industry, various modifications of structural details may be made within the scope of the invention.

It will be apparent that in both forms of the invention, as herein illustrated and specifically described, the band comprises a series of relatively narrow sections of flat sheet steel stock of high tensile strength welded in edge to edge relation into an integral unit of uniform thickness throughout and having its work engaging face disposed wholly in a single plane on both sides of the welded joints and across said joints.

Having thus described my invention what I claim as new and desire to secure by Letters Patent of the United States is,

1. For a vulcanizing machine, a wide, endless tension band comprising a plurality of longitudinal steel sections of equal length each made endless by a transverse butt-weld, the sections being butt-welded together along their longitudinal edges, the respective transverse welds being staggered longitudinally with appreciable spacing and the band as a whole presenting a smooth continuous surface.

2. For a vulcanizing machine, a wide, endless pressure band comprising a series of endless steel sections each having a transverse weld therein and being integrally united to adjacent sections by longitudinal welds, the transverse welds being staggered with the maximum spacing permitted by the number of sections and the length of the band and the band as a whole presenting a continuous polished surface.

3. A wide endless tension band for use in a vulcanizing machine having a vulcanizing drum against a substantial arcuate portion of which the band is adapted continuously to press vulcanizable material held therebetween as the band under tension moves along with the drum, the band comprising a plurality of endless ribbon-like steel sections of high tensile strength, narrower than the band and of equal length and thickness, welded in edge to edge relation into an integral unit of uniform thickness on both sides of and across the welded edge-to-edge joints and having one face lying wholly in a single plane on both sides of and across said joints.

4. A wide endless tension band for use in a vulcanizing machine having a vulcanizing drum against a substantial arcuate portion of which the band is adapted continuously to press vulcanizable material held therebetween as the band under tension moves along with the drum, the band comprising a series of relatively narrow sections of flat sheet steel stock of high tensile strength welded in edge to edge relation into an integral unit of uniform thickness throughout and having one face disposed wholly in a single plane on both sides of its welded joints and across said joints.

5. A wide endless tension band for use in a vulcanizing machine having a vulcanizing drum against a substantial arcuate portion of which the band is adapted continuously to press vulcanizable stock held therebetween as the band under tension moves along with the drum, the band comprising a series of relatively narrow sections of flat sheet steel stock of high tensile strength and of a length equal to the width of the band, welded in edge to edge relation into an integral unit of uniform thickness and on opposite sides of and across the welded edge-to-edge joints and having one face disposed wholly in a single plane on both sides of said joints and across said joints.

JOHN M. BIERER.